(12) United States Patent
Yoon et al.

(10) Patent No.: US 12,114,771 B2
(45) Date of Patent: Oct. 15, 2024

(54) PREFABRICATED SHELF

(71) Applicant: Speedrack Co., Ltd., Gimpo-si (KR)

(72) Inventors: Hyo Sang Yoon, Gimpo-si (KR); Yoon Ki Kim, Incheon (KR); Jae Koon Han, Gimpo-si (KR); Jun Hyuk Lee, Seoul (KR)

(73) Assignee: SPEEDRACK CO., LTD., Gimpo-si (KR)

( * ) Notice: Subject to any disclaimer, the term of this patent is extended or adjusted under 35 U.S.C. 154(b) by 0 days.

(21) Appl. No.: 18/167,814

(22) Filed: Feb. 10, 2023

(65) Prior Publication Data

US 2023/0363530 A1 Nov. 16, 2023

(30) Foreign Application Priority Data

May 12, 2022 (KR) .................. 10-2022-0058370

(51) Int. Cl.
*A47B 47/00* (2006.01)
(52) U.S. Cl.
CPC ...... *A47B 47/0083* (2013.01); *A47B 2230/16* (2013.01)
(58) Field of Classification Search
CPC ... A47B 47/0083; A47B 47/02; A47B 47/021; A47B 47/022; A47B 47/024; A47B 47/025; A47B 47/027; A47B 47/028; A47B 47/03; A47B 57/30; A47B 57/32; A47B 57/34; A47B 57/36; A47B 57/38; A47B 57/40; A47B 57/402; A47B 57/404; A47B 57/406; A47B 57/408; A47B 57/42;

(Continued)

(56) References Cited

U.S. PATENT DOCUMENTS

| | | | | |
|---|---|---|---|---|
| 1,366,743 A | * | 1/1921 | O'Connor | A47B 47/021 108/107 |
| 3,244,290 A | * | 4/1966 | Kaufman et al. | A47B 57/50 211/189 |

(Continued)

FOREIGN PATENT DOCUMENTS

| | | |
|---|---|---|
| CN | 108488178 A | 9/2018 |
| JP | S51133423 U | 10/1976 |

(Continued)

*Primary Examiner* — Joshua E Rodden
(74) *Attorney, Agent, or Firm* — CANTOR COLBURN LLP

(57) ABSTRACT

Provided is prefabricated furniture and, more particularly, to a prefabricated shelf (angle) having assembly holes and assembly protrusions for assembling frames together, the frames being more firmly assembled as a pressing protrusion portion protrudes from a narrow portion of an assembly hole so that an assembly protrusion is forcibly fitted by the pressing protrusion part. The prefabricated shelf includes a first frame in which a pair of assembly holes, each having a wide portion and a narrow portion, are arranged symmetrically, and a second frame in which a pair of assembly protrusions, corresponding to the assembly holes and each protruding to fit into the narrow portion, are arranged symmetrically, wherein the narrow portion includes a pressing protrusion portion configured to protrude from a first end thereof and press the assembly protrusion to a second side thereof to force the assembly protrusion into place.

5 Claims, 9 Drawing Sheets

(58) Field of Classification Search
CPC ..... A47B 57/48; A47B 57/482; A47B 57/487;
A47B 57/50; A47B 57/52; A47B
87/0215; A47B 96/1458; A47B 2230/16;
F16B 5/0036; F16B 12/34; F16B 12/50;
F16B 2012/505
USPC .......................................................... 211/189
See application file for complete search history.

(56) References Cited

U.S. PATENT DOCUMENTS

| | | | | |
|---|---|---|---|---|
| 3,465,895 | A * | 9/1969 | Miller | A47B 57/402 |
| | | | | 403/353 |
| 4,074,812 | A | 2/1978 | Skubic et al. | |
| 4,729,484 | A * | 3/1988 | McConnell | A47B 57/402 |
| | | | | 211/183 |
| 4,778,067 | A * | 10/1988 | Bellerose | A47B 57/50 |
| | | | | 211/187 |
| 10,702,062 | B2 * | 7/2020 | Lee | A47B 57/50 |
| 11,039,686 | B2 * | 6/2021 | Min | A47B 47/0083 |
| 11,896,121 | B2 * | 2/2024 | Globerman | A47B 47/0058 |
| 11,925,258 | B2 * | 3/2024 | Chakraborthy | A47B 57/50 |
| 2020/0054126 | A1 * | 2/2020 | Globerman | A47B 47/0083 |
| 2022/0338621 | A1 * | 10/2022 | Han | A47B 47/0041 |
| 2023/0129296 | A1 * | 4/2023 | Chakraborthy | A47B 57/50 |
| | | | | 211/134 |

FOREIGN PATENT DOCUMENTS

| | | | | |
|---|---|---|---|---|
| JP | S62177325 U | | 11/1987 | |
| JP | 2017153514 A | | 9/2017 | |
| KR | 200473407 Y1 | | 7/2014 | |
| KR | 2020141799 A | * | 12/2020 | ......... A47B 47/0058 |
| KR | 20200141799 A | | 12/2020 | |
| KR | 102319236 | | 11/2021 | |
| KR | 20220034479 A | | 3/2022 | |
| WO | 2019218918 A1 | | 11/2019 | |

* cited by examiner

PREFABRICATED SHELF

BACKGROUND OF THE INVENTION

Field of the Invention

The present disclosure relates to prefabricated furniture and, more particularly, to a prefabricated shelf (angle) having assembly holes and assembly protrusions for assembling frames together, the frames being more firmly assembled as a pressing protrusion portion protrudes from a narrow portion of an assembly hole so that an assembly protrusion is forcibly fitted by the pressing protrusion part.

Description of the Related Art

In general, a multi-level shelving unit installed in built-in closets or dressing rooms, or prefabricated furniture, especially a prefabricated shelf (angle) used as a piece of office furniture, a table, a work station, an exhibition stand is a frame structure in which vertical frames and horizontal frames are combined, and it is possible to place an item on a shelf by mounting the shelf on the combined horizontal frames.

Such prefabricated furniture or a prefabricated shelf has an assembly structure that allows easy assembling without additional tools and maintains the assembled state firmly. Typically, a plurality of assembly holes are provided on a vertical frame, and assembly protrusions are provided at both ends of a horizontal frame to be inserted into the assembly holes, so that an assembly height of the horizontal frame, that is, the height of a shelf, may be changed.

Prefabricated shelves are widely used because users can freely change the height of the shelf to suit their needs.

Meanwhile, an example of a prefabricated shelf in the related art is introduced in Korean Patent No. 10-2319236.

In the above related art, an assembly hole consisting of an upper part with wide left-right width and a lower part with narrow left-right width in a slit shape is provided on a vertical frame in a pair of left and right, and an assembly protrusion inserted into the assembly hole is provided on a horizontal frame in a pair of left and right, so that the assembly protrusion is assembled by being inserted into the assembly hole in an interference fit manner.

Yet, in the case of the above related art, since the assembly protrusion is supported only on one side of the assembly hole and spaced apart from the other side of the assembly hole, the supporting force for the assembly protrusion is weak, and in the assembled state, there is a risk that the assembly protrusion is bent toward the spaced-apart side, which makes reassembly after disassembly difficult and reduces stability.

SUMMARY OF THE INVENTION

Accordingly, the present disclosure has been made keeping in mind the above problems occurring in the related art, and the present disclosure is intended to provide a prefabricated shelf with a pressing protrusion portion that presses and holds an assembly protrusion protrudes from a narrow portion of an assembly hole into which the assembly protrusion is inserted in order to increase assembly stability by maintaining the tight fit of the assembly protrusion and the assembly hole more firmly.

In order to achieve the above objective, according to an embodiment of the present disclosure, there is provided a prefabricated shelf, including: a first frame in which a pair of assembly holes, each having a wide portion and a narrow portion, are arranged left-right symmetrically; and a second frame in which a pair of assembly protrusions, corresponding to the pair of assembly holes and each protruding to fit into the narrow portion, are arranged left-right symmetrically, wherein the narrow portion may include a pressing protrusion portion configured to protrude from a first end thereof and press the assembly protrusion to a second side thereof to force the assembly protrusion into place.

In addition, in the prefabricated shelf according to the present disclosure, the pressing protrusion portion may consist of a pair of pressing protrusions arranged apart up and down, and the assembly protrusion may include a fixing protrusion portion fitted into a fixing groove located between the pair of pressing protrusions.

In addition, in the prefabricated shelf according to the present disclosure, in the assembly protrusion, upper and lower surfaces of a fitting portion may be connected to each other in a downward slope at a predetermined slightly-tilted angle toward the fixing protrusion portion with respect to the fixing protrusion portion, so that an upper support surface of the fitting portion, the fixing protrusion portion, and a lower support surface of the fitting portion may be connected in a zigzaged manner.

In addition, in the prefabricated shelf according to the present disclosure, the second frame may include a guide protrusion part protruding from a side of the assembly hole and contacting an end of the first frame.

According to a prefabricated shelf of the present disclosure, a pressing protrusion portion provided in a narrow portion into which an assembly protrusion is fitted presses the assembly protrusion so that the assembly protrusion can be more firmly coupled to an assembly hole, resulting in excellent assembly stability.

According to the prefabricated shelf of the present disclosure, the pressing protrusion portion is composed of a pair of pressing protrusions, and the assembly protrusion is provided with a fixing protrusion portion inserted into a fixing groove between the pressing protrusions, so that the assembly protrusion does not easily fall out of the assembly hole, further increasing the robustness of the assembly.

According to the prefabricated shelf of the present disclosure, a fitting portion of the assembly protrusion has an upper supporting surface and a lower supporting surface connected in a zigzaged manner around the fixing protrusion portion, so that the fixing protrusion portion is tightly fitted into the fixing groove and the pressing protrusions completely adhere to the assembly protrusion, making the fit more stable.

According to the prefabricated shelf of the present disclosure, a guide upper surface provided on the upper pressing protrusion makes it easier for the fixing protrusion portion to be inserted, thereby increasing the convenience of assembly.

According to the prefabricated shelf of the present disclosure, a guide protrusion part protruding from one side of the assembly hole guides and holds one end of a frame, preventing damage such as bending of the assembly protrusion.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
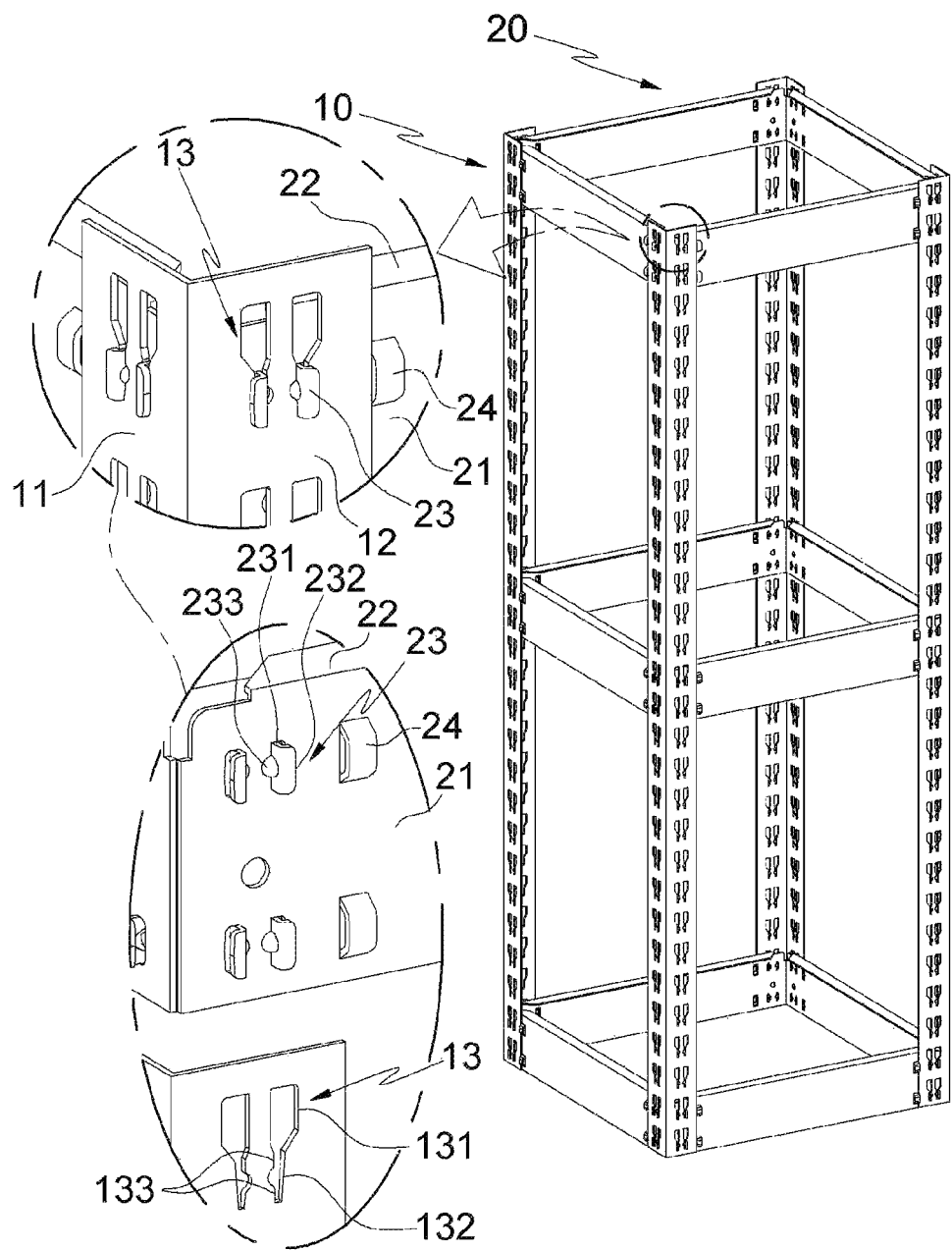
FIG. 1 is a perspective view of a prefabricated shelf according to the present disclosure.
Figure 2:
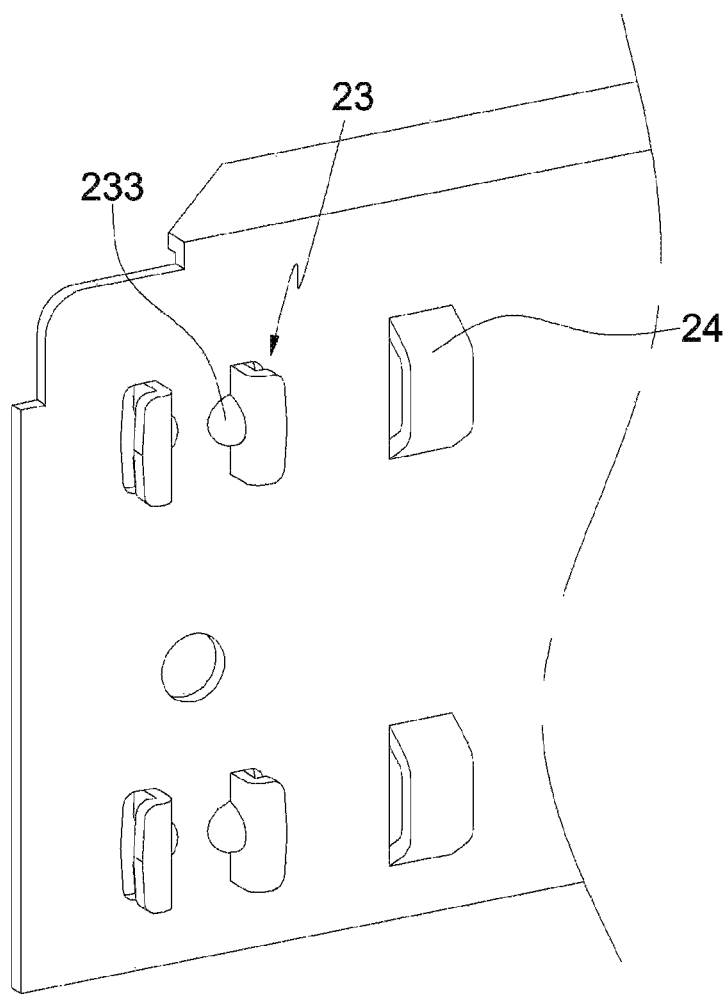
FIG. 2 is a perspective view of the main part of a horizontal frame according to the present disclosure.
Figure 3:
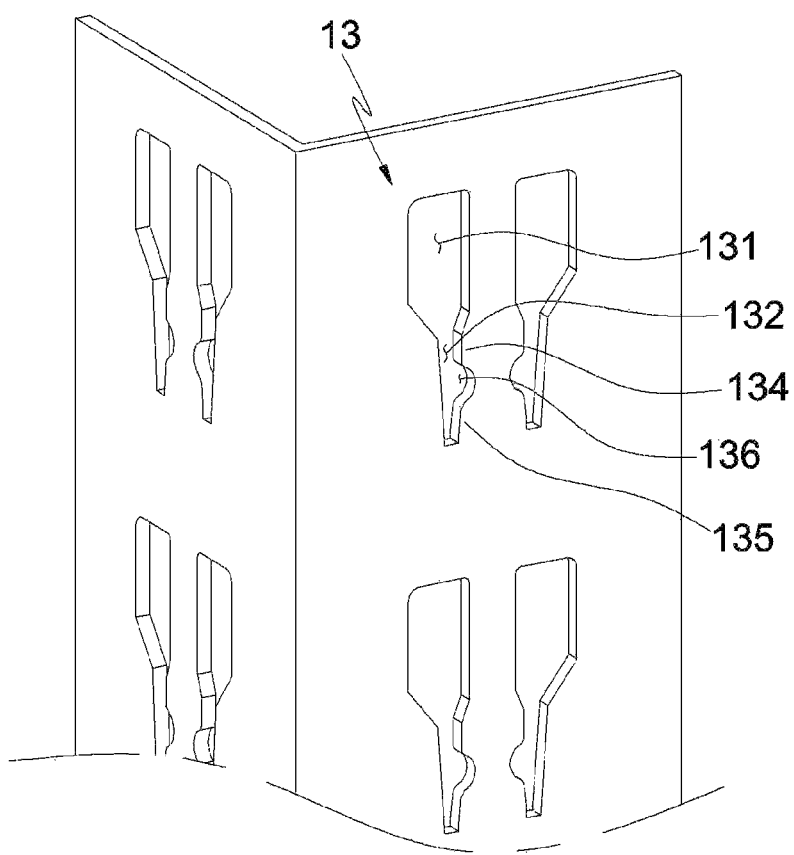
FIG. 3 is a perspective view of the main part of a vertical frame according to the present disclosure.
Figure 4:
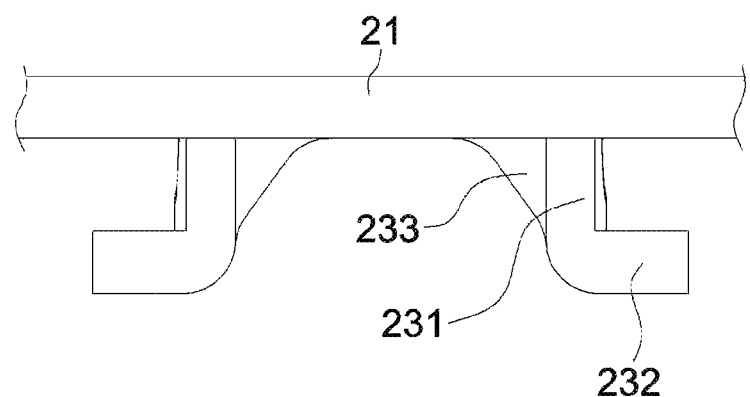
FIG. 4 is a plan view of the main part of the horizontal frame according to the present disclosure.
Figure 5:
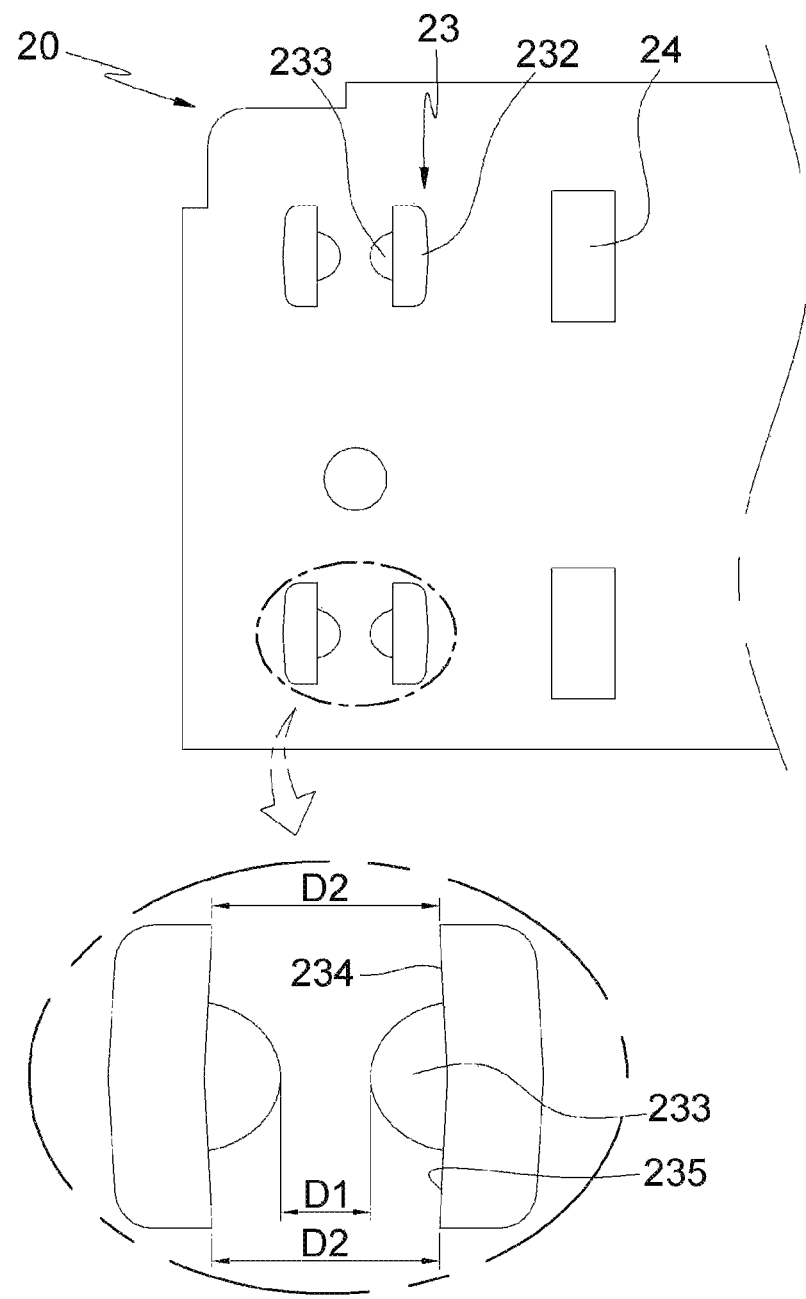
FIG. 5 is a front view of the main part of the horizontal frame according to the present disclosure.
Figure 6:
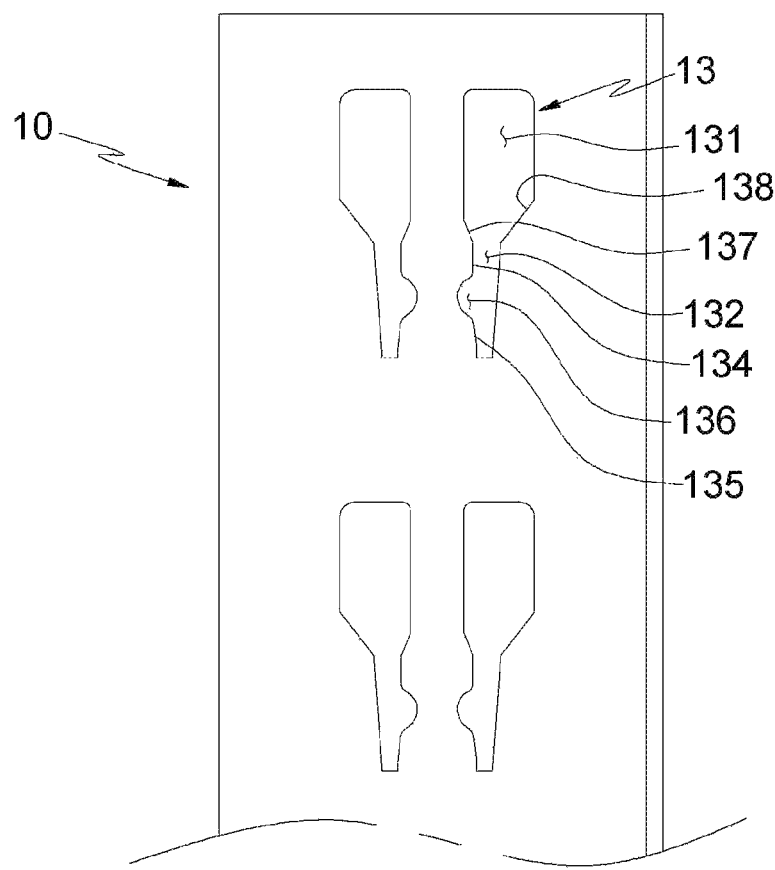
FIG. 6 is a front view of the main part of the vertical frame according to the present disclosure.
Figure 7:
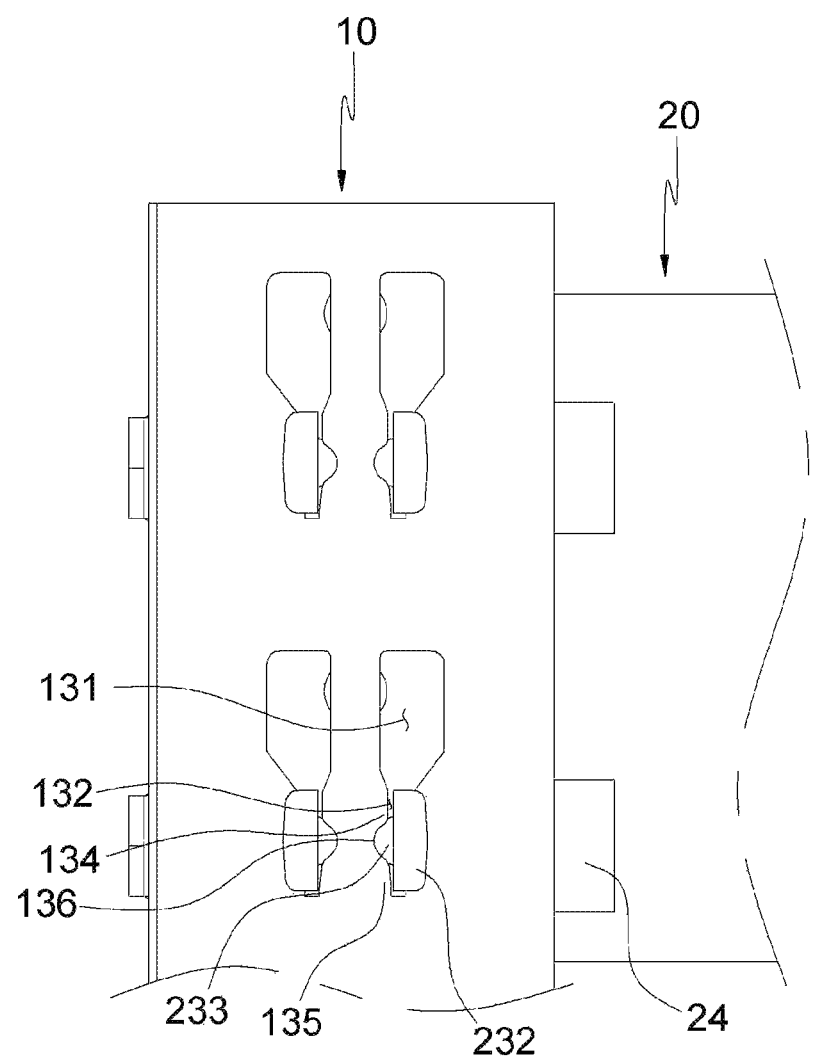
FIG. 7 is a front view showing a combined state of the horizontal frame and the vertical frame shown in FIGS. 5 and 6.

Since the present disclosure may be variously modified and may have various forms, aspects (or embodiments) will be described in detail in the text. However, this is not intended to limit the present disclosure to a specific form, and it should be understood to include all changes, equivalents, or substitutes are included in the spirit and technical scope of the present disclosure.

In each drawing, the same reference numeral, particularly reference numerals having the same number of tens digits and ones digits, or tens digits, ones digits, and alphabets indicate members having the same or similar functions, and unless otherwise specified, members indicated by each reference numeral in the drawings may be identified as members conforming to these standards.

In addition, although components in each drawing are expressed in exaggeratedly large (or thick) or small (or thin) in size or thickness, or simplified in consideration of the convenience of understanding, the protection scope of the present disclosure should not be construed as being limited thereby.

Terms used in this specification are only used to describe a specific aspect (or embodiment), and are not intended to limit the present disclosure. Singular expressions include plural expressions unless the context clearly indicates otherwise.

It should be understood that the terms "comprise," "include", "have", and/or "consist of" when used herein, specify the presence of stated features, numbers, steps, operations, elements, and/or components but do not preclude the presence or addition of one or more other features, numbers, steps, operations, elements, components, and/or groups thereof.

Also, unless otherwise defined, all terms used herein, including technical or scientific terms, have the same meaning as commonly understood by a person skilled in the art. Terms such as those defined in the commonly used dictionaries should be construed as having meanings consistent with the meanings in the context of the related art and shall not be construed in ideal or excessively formal meanings unless expressly defined in this application.

The terms such as "first" and "second" described in this specification are only used to distinguish between different components from each other, and are not limited to the order in which they are manufactured, and may not match the names in the detailed description of the invention and the claims.

For convenience in describing a prefabricated shelf according to the present disclosure, if a rough direction standard that is not strict is specified with reference to FIG. 1, the direction in which gravity acts is set as the bottom, and the top, bottom, left, and right directions are set accordingly as shown. In the detailed description related to other drawings and in the claims, directions are specified and described according to this criterion unless otherwise specified.

Hereinafter, the prefabricated shelf according to the present disclosure will be described with reference to the accompanying drawings.

As shown in FIGS. 1 to 7, the present disclosure is a frame structure in which a first frame having assembly holes 13 and a second frame having assembly protrusions 23 are combined.

In the drawing, an embodiment in which a vertical frame 10 is provided with the assembly holes 13 and a horizontal frame 20 is provided with the assembly protrusions 23 is shown as a representative example, but a conversely configured case is also possible. Nevertheless, it is more preferable to be configured with a structure having the vertical frame 10 and the horizontal frame 20 as shown in the drawing for convenience of assembly and enhancement of assembly strength.

To be specific, the present disclosure includes: the vertical frame 10 in which a pair of assembly holes 13 having a wide portion 131 and a narrow portion 132 are arranged left-right symmetrically; and the horizontal frame 20 in which a pair of assembly protrusions 23, corresponding to the pair of assembly holes 13 and each protruding to fit into the narrow portion 132, are arranged left-right symmetrically.

The narrow portion 132 includes a pressing protrusion portion 133 that protrudes from one end thereof and presses the assembly protrusion 23 to the other side thereof so that the assembly protrusion 23 is forcibly fitted.

The vertical frame 10 is a first support part 11 and a second support part 12 bent and connected at right angles, and in each support part 11, 12, a plurality of assembly holes 13 in left/right pairs are arranged at a predetermined interval in the longitudinal direction.

The assembly hole 13 is composed of the upper wide portion 131 and the lower narrow portion 132. The narrow portion 132 is biasedly connected to the lower part of the inner side of the wide portion 131 (on the right side in the case of the left-side wide portion 131 and on the left side in the case of the right-side wide portion 131), and the width of each end thereof is formed to become narrower toward the lower side. Especially, the other (outer) end of the narrow portion 132 is connected downwardly at a slight angle toward one end.

In addition, the pressing protrusion portion 133 includes a pair of pressing protrusions 134 and 135 spaced apart from each other up and down.

Each of the pressing protrusions 134 and 135 protrudes in an angular or curved shape, and a fixing groove 136 curvedly connected in a semicircular shape is formed between the pair of pressing protrusions 134 and 135.

In addition, the upper pressing protrusion 134 of the pressing protrusion portion 133 includes a first guide upper surface 137 that is inclined downward in the other direction and guides a fixing protrusion portion 233 of the assembly protrusion 23 to the other side.

At the upper end of the other end of the narrow portion 132, a second guide upper surface 138 that is inclined downward in the opposite direction at an angle corresponding to the first guide upper surface 137 is provided so as to guide the assembly protrusion 23 fitted into the narrow portion 132, especially both sides of a fitting portion 231.

Figure 8:
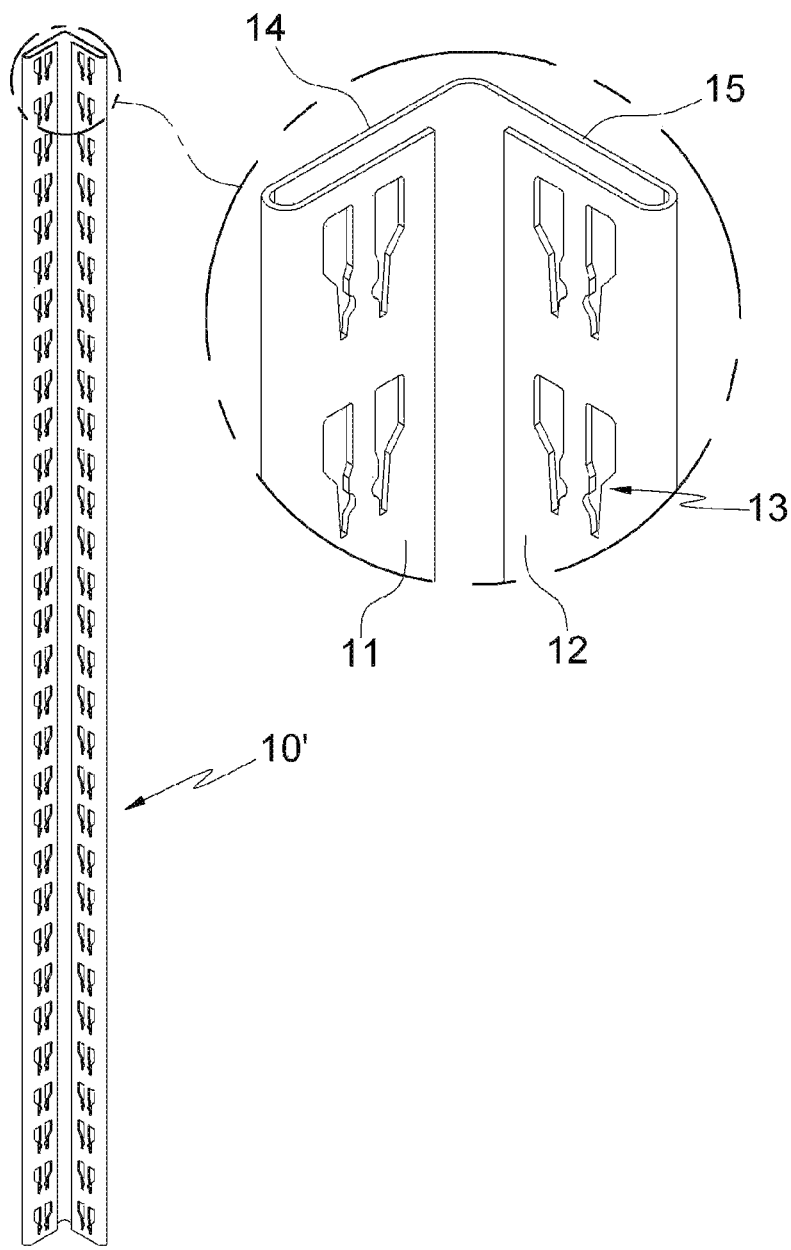
FIG. 8 is a perspective view showing a modification of the vertical frame according to the present disclosure.

Meanwhile, FIG. 8 shows a hidden-type vertical frame 10'.

The hidden-type vertical frame 10' has a form in which each of support parts 11 and 12 is bent 180 degrees inward from each end of outer shielding parts 14 and 15 that are bent and connected at right angles. As assembly holes 13 are provided in the support parts 11 and 12, the assembly holes 13 are not exposed to the outside and are covered.

Again, as shown in FIGS. 1 to 7, the horizontal frame 20 is a connection part 21 and a support part 22 bent and connected at right angles, and in the connection part 21, a pair of left and right assembly protrusions 23 are arranged at a predetermined interval up and down, so that four assembly protrusions 23 are provided at the left and right ends of the horizontal frame 20, respectively.

The assembly protrusion 23 is formed by cutting a part of the connection part 21 and consists of a fitting portion 231 and a hooking portion 232 bent at right angles and connected. The left and right assembly protrusions 23 are symmetrical to each other as respective hooking portions thereof 232 are bent in the outward opposite direction.

At this time, the hooking portion 232 has a smaller size than the wide portion 131, and the fitting portion 231 has a thickness corresponding to the left-right width of the narrow portion 132.

The narrow portion 132 is vertically longer than the fitting portion 231, and the pressing protrusions 134 and 135 and the fixing groove 136 are formed at the end of the narrow portion 132 corresponding to the vertical length of the fitting portion 231.

In addition, the fixing protrusion portion 233 is formed to protrude in an embossed shape so as to be convex to one side from the other side of the fitting portion 231.

At this time, based on the fixing protrusion portion 233, the fitting portion 231 has the upper and lower surfaces connected to each other in a downward slope at a predetermined slightly-tilted angle toward the fixing protrusion portion 233, so that an upper support surface 234 of the fitting portion 231, the fixing protrusion portion 233, and a lower support surface 235 of the fitting portion 231 are connected in a zigzaged manner.

At this time, the left and right assembly protrusions 23 are foiled so that the gap D1 between the fixing protrusion portions 233 is narrower than the gap D2 between the upper support surfaces 234 and the lower support surfaces 235. Accordingly, as the pressing protrusions 134 and 135 are closely attached to the upper support surface 234 and the lower support surface 235, the fixing protrusion portion 233 is tightly fitted and inserted into the fixing groove 136, so that the assembly protrusion 23 is more firmly coupled to the assembly hole 13 and the coupled state is maintained.

In addition, the horizontal frame 20 includes a guide protrusion part 24 protruding from one side of the assembly protrusion 23 and contacting one end of the vertical frame 10.

The guide protrusion part 24 protrudes in the form of a bridge as a part of the connection part 21 is incised, and a pair of the guide protrusion parts 24 arranged on the upper and lower collinear lines are provided in one set.

Figure 9:
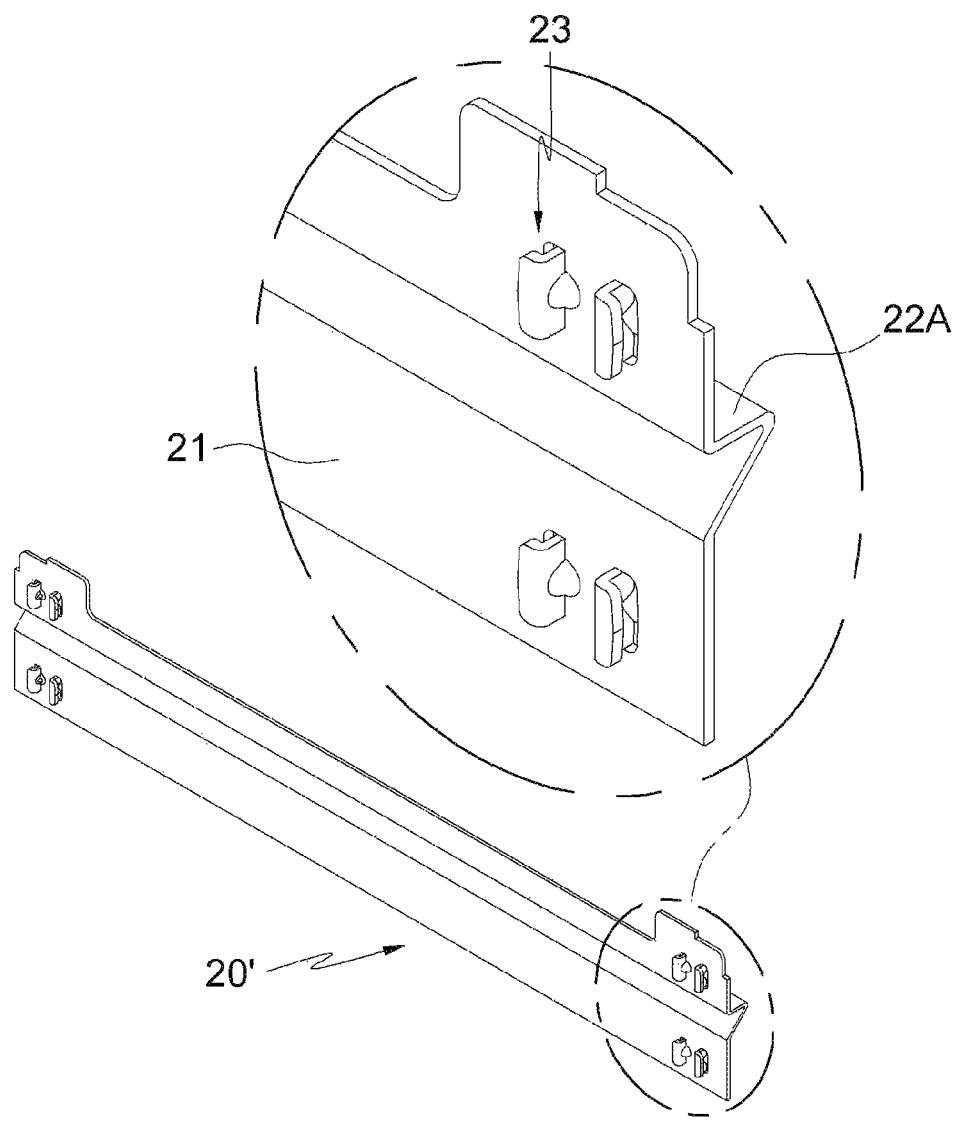
FIG. 9 is a perspective view showing a modification of the horizontal frame according to the present disclosure.

Meanwhile, FIG. 9 shows an intermediate support type horizontal frame 20' in which a part of the middle portion of the connection part 21 is bent into an inner wedge shape to form a support portion 22A. The intermediate support type horizontal frame 20' is used such that a shelf is mounted on the support portion 22A located at the middle-end height of the horizontal frame 20.

In the present disclosure of the above configuration, first, when the horizontal frame 20 is pressed downwards while the hooking portion 232 penetrates the wide portion 131 from the inside to the outside of the vertical frame 10, the fitting portion 231 is inserted into the narrow portion 132, and the assembly protrusion 23 is forcibly fitted to the assembly hole 13 to assemble the vertical frame 10 and the horizontal frame 20.

At this time, when the fitting portion 231 on the wide portion 131 is pressed downward, as the lower end of the fitting portion 231 contacts the second guide upper surface 138, respective fitting portions 231 of the left and right assembly protrusions 23 are fitted while receiving a force in the direction of inward retraction.

In this state, the fixing protrusion portion 233 rides the first guide upper surface 137 to pass over the upper pressing protrusion 134 and is inserted into the fixing groove 136, and as the upper pressing protrusion 134 and the lower pressing protrusion 135 are respectively in contact with the upper support surface 234 and the lower support surface 235 of the fitting portion 231, respective fitting portions 231 of the left and right assembly protrusions 23 are fitted under force in the direction of opening outwards.

In conclusion, the fitting portion 231 of the assembly protrusion 23 is fitted in such a way that both sides thereof are supported by the pressing protrusions 134 and 135 of one side of the narrow portion 132 and the other end of the narrow portion 132, so that the assembly protrusion 23 is more firmly assembled to the assembly hole 13, and thus the assembly protrusions 23 are not bent by external pressure in the left and right direction acting on the horizontal frame 20.

Furthermore, as one end of the vertical frame 10 is supported by the guide protrusion part 24, the vertical frame 10 is sandwiched between the assembly protrusions 23 and the guide protrusion part 24, so that left-right sway of the horizontal frame 20 does not occur. Therefore, while there is no problem such as bending of the fitting portion 231 of the assembly protrusion 23, the assembly protrusion 23 and the assembly hole 13 are combined with each other with strong force, thereby further improving the assembly strength of the vertical frame 10 and the horizontal frame 20.

In particular, in the present disclosure, since the fixing protrusion portion 233 having an embossing shape is not bent due to the pressing protrusions 134 and 135 and the fixing groove 136, it is possible to prevent the fixing protrusion portion 233 from bursting or breaking.

In describing the present disclosure above, the prefabricated shelf has been mainly described with reference to the accompanying drawings. However, the present disclosure may be variously modified, altered, and substituted by those skilled in the art, and such modifications, alterations and substitutions should be construed as falling within the scope of protection of the present disclosure.

What is claimed is:
1. A prefabricated shelf, comprising:
 a first frame in which a pair of assembly holes, each having a wide portion and a narrow portion, are arranged left-right symmetrically; and
 a second frame in which a pair of assembly protrusions, corresponding to the pair of assembly holes and each protruding to fit into the narrow portion, are arranged left-right symmetrically,
 wherein the narrow portion comprises a pressing protrusion portion configured to protrude from a first end thereof and press the assembly protrusion to a second side thereof to force the assembly protrusion into place, wherein the pressing protrusion portion includes a pair of pressing protrusions arranged apart up and down, and wherein the assembly protrusion comprises a fixing protrusion portion fitted into a fixing groove located between the pair of pressing protrusions.

2. The prefabricated shelf of claim 1, wherein in the assembly protrusion, an upper support surface and a lower support surface of a fitting portion are connected to each other in a downward slope at a predetermined slightly-tilted angle toward the fixing protrusion portion, so that the upper support surface of the fitting portion, the fixing protrusion portion, and the lower support surface of the fitting portion are connected in a zigzaged manner.

3. The prefabricated shelf of claim 1, wherein the second frame comprises a guide protrusion part protruding from a side of the assembly hole and contacting an end of the first frame.

4. The prefabricated shelf of claim 1, wherein the second frame comprises a guide protrusion part protruding from a side of the assembly hole and contacting an end of the first frame.

5. The prefabricated shelf of claim 2, wherein the second frame comprises a guide protrusion part protruding from a side of the assembly hole and contacting an end of the first frame.

\* \* \* \* \*